United States Patent
Suhara et al.

(10) Patent No.: US 11,740,453 B2
(45) Date of Patent: Aug. 29, 2023

(54) APPARATUS CONFIGURED TO FLY LIGHT-ABSORBING MATERIAL, APPARATUS CONFIGURED TO MODEL THREE-DIMENSIONAL MODELED OBJECT, AND METHOD OF FLYING LIGHT-ABSORBING MATERIAL

(71) Applicants: Hiroyuki Suhara, Kanagawa (JP); Takashi Fujita, Kanagawa (JP); Atsushi Takeuchi, Kanagawa (JP); Kohji Sakai, Tokyo (JP); Asato Tamura, Tokyo (JP); Shohta Kobashigawa, Tokyo (JP)

(72) Inventors: Hiroyuki Suhara, Kanagawa (JP); Takashi Fujita, Kanagawa (JP); Atsushi Takeuchi, Kanagawa (JP); Kohji Sakai, Tokyo (JP); Asato Tamura, Tokyo (JP); Shohta Kobashigawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 364 days.

(21) Appl. No.: 16/887,366

(22) Filed: May 29, 2020

(65) Prior Publication Data
US 2020/0379251 A1 Dec. 3, 2020

(30) Foreign Application Priority Data

Jun. 3, 2019 (JP) .................................. 2019-103590

(51) Int. Cl.
*G02B 26/12* (2006.01)
*G02F 1/11* (2006.01)
(Continued)

(52) U.S. Cl.
CPC ............ *G02B 26/124* (2013.01); *G01B 11/24* (2013.01); *G02F 1/11* (2013.01); *H01S 3/067* (2013.01)

(58) Field of Classification Search
CPC .... G02B 26/12; G02B 26/121; G02B 26/124; G02B 26/10; B23K 26/36; B23K 26/38;
(Continued)

(56) References Cited

U.S. PATENT DOCUMENTS 6,025,110 A 2/2000 Nowak
10,471,538 B2 11/2019 Zenou et al.
(Continued)

FOREIGN PATENT DOCUMENTS

JP 2015-144252 A 8/2015
JP 2016-052745 4/2016
(Continued)

OTHER PUBLICATIONS

U.S. Appl. No. 16/736,963, (filed Jan. 8, 2020).
(Continued)

*Primary Examiner* — Jie Lei
(74) *Attorney, Agent, or Firm* — Harness, Dickey & Pierce, P.L.C.

(57) ABSTRACT

An apparatus configured to fly a light-absorbing material, includes a unit configured to irradiate a light-absorbing material absorbing light with a laser beam corresponding to a light absorption wavelength of the light-absorbing material to fly the light-absorbing material. When a preceding beam radiation region and a following beam radiation region overlap, the following beam radiation region is irradiated with the laser beam such that a beam centroid position is outside the preceding beam radiation region.

16 Claims, 14 Drawing Sheets

(51) Int. Cl.
 *G01B 11/24* (2006.01)
 *H01S 3/067* (2006.01)
(58) Field of Classification Search
 CPC .... B23K 26/34; B23K 26/382; B23K 26/386;
  B23K 26/064; G02F 1/11; G02F 1/33;
  G01B 11/24; H01S 3/067; H01S 3/0085
 USPC ...... 359/285, 238, 719, 197.1, 198.1, 200.1;
  219/121.68, 121.61, 121.6, 121.65,
  219/121.69, 121.8
 See application file for complete search history.

(56) References Cited

U.S. PATENT DOCUMENTS

| | | |
|---|---|---|
| 2004/0179255 A1 | 9/2004 | Suhara |
| 2015/0042740 A1 | 2/2015 | Suhara et al. |
| 2016/0070195 A1 | 3/2016 | Tachibana et al. |
| 2017/0157845 A1 | 6/2017 | Bihari et al. |
| 2017/0189995 A1 | 7/2017 | Zenou et al. |
| 2017/0348872 A1 | 12/2017 | Suzuki et al. |
| 2018/0193948 A1 | 7/2018 | Zenou et al. |
| 2019/0126538 A1 | 5/2019 | Fujita et al. |
| 2019/0381783 A1 | 12/2019 | Bihari et al. |
| 2020/0006909 A1* | 1/2020 | Kwon ................... B23K 26/53 |
| 2020/0031052 A1 | 1/2020 | Nishio et al. |

FOREIGN PATENT DOCUMENTS

| | | |
|---|---|---|
| JP | 2017-039253 A | 2/2017 |
| JP | 2017-523063 A | 8/2017 |
| JP | 2017-528902 | 9/2017 |
| JP | 2018-523751 A | 8/2018 |
| JP | 6455588 | 12/2018 |

OTHER PUBLICATIONS

Brasz, C.F. et al. "Tilting of adjacent laser-induced liquid jets." *Microfluidics and Nanofluidics*, vol. 18, No. 2 (2015): pp. 185-197.
Li, Q. "Double-pulse Laser-induced Forward Transfer." Aix-Marseille University. Doctoral School: Physics and Sciences of the Matter. Lasers, Plasmas and Photonic Process (PL3) Laboratory. (2019) Retrieved from the Internet: URL: https://www.theses.fr/2019AIXM0033.pdf.
Serra, P. and A. Piqué. "Laser-Induced Forward Transfer: Fundamentals and Applications." *Advanced Materials Technologies*, vol. 4, No. 1 (2019): p. 1800099.
Extended European Search Report dated Jan. 18, 2021 issued in corresponding European Appln. No. 20176712.6.
Office Action dated Feb. 14, 2023 corresponding JP patent application No. 2019-103590.

* cited by examiner

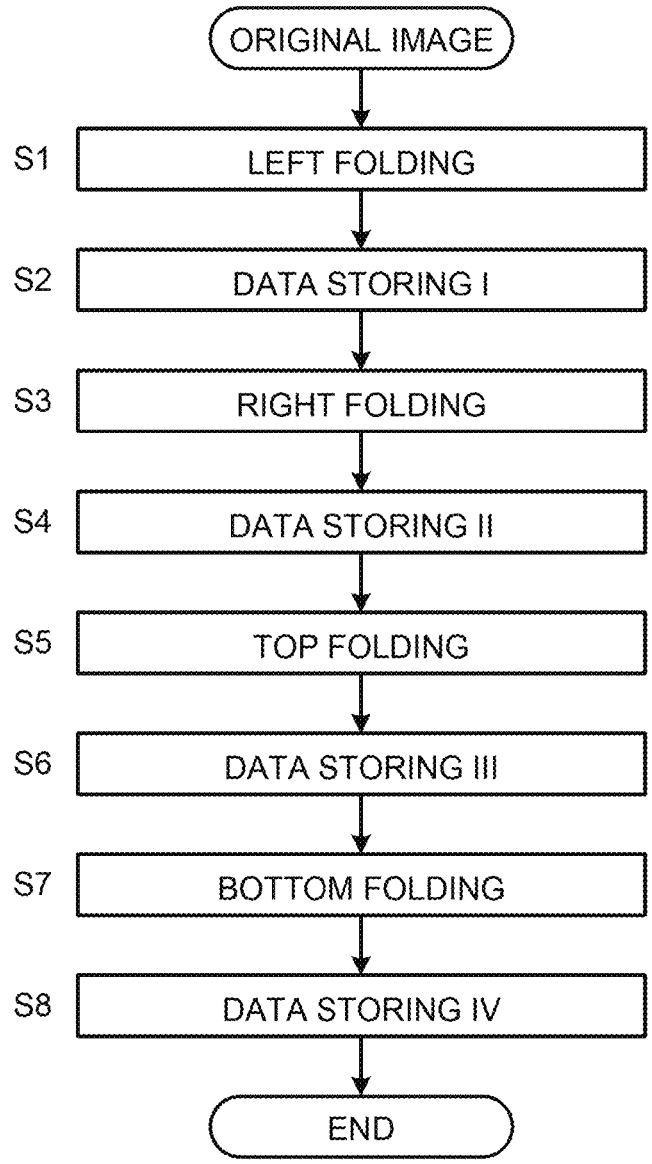

US 11,740,453 B2

APPARATUS CONFIGURED TO FLY LIGHT-ABSORBING MATERIAL, APPARATUS CONFIGURED TO MODEL THREE-DIMENSIONAL MODELED OBJECT, AND METHOD OF FLYING LIGHT-ABSORBING MATERIAL

CROSS-REFERENCE TO RELATED APPLICATIONS

The present application claims priority under 35 U.S.C. § 119 to Japanese Patent Application No. 2019-103590, filed on Jun. 3, 2019. The contents of which are incorporated herein by reference in their entirety.

BACKGROUND OF THE INVENTION

1. Field of the Invention

The present invention relates to an apparatus configured to fly a light-absorbing material, an apparatus configured to model a three-dimensional modeled object, and a method of flying a light-absorbing material.

2. Description of the Related Art

Conventionally, it is known to irradiate a light-absorbing material with an optical vortex laser beam corresponding to the light-absorption wavelength of the light-absorbing material to fly the light-absorbing material by energy of the optical vortex laser beam in a direction in which the optical vortex laser beam is emitted to attach the light absorbing material to an attachment target (Japanese Patent No. 6455588).

When a light-absorbing material is irradiated with a laser beam to fly the light-absorbing material, the light-absorbing material sometimes does not fly in the direction in which the laser beam is emitted.

SUMMARY OF THE INVENTION

According to an aspect of the present invention, an apparatus configured to fly a light-absorbing material, includes a unit configured to irradiate a light-absorbing material absorbing light with a laser beam corresponding to a light absorption wavelength of the light-absorbing material to fly the light-absorbing material. When a preceding beam radiation region and a following beam radiation region overlap, the following beam radiation region is irradiated with the laser beam such that a beam centroid position is outside the preceding beam radiation region.

BRIEF DESCRIPTION OF THE DRAWINGS

FIG. 21 is a flowchart serving to illustrate a sixth embodiment of the present invention;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
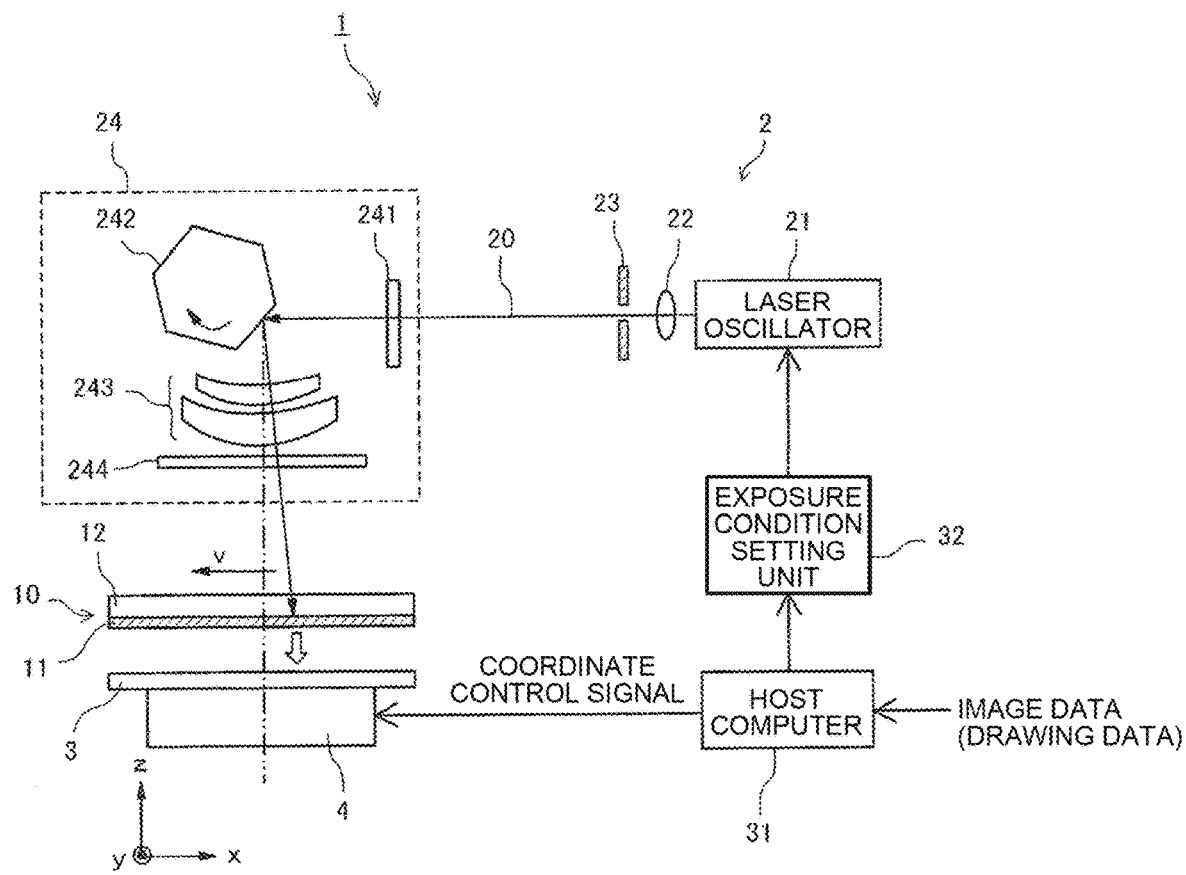
FIG. 1 is a diagram of an apparatus configured to fly a light-absorbing material according to a first embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to improve the accuracy of the direction in which the light-absorbing material flies.

Embodiments of the present invention will be described below with reference to the accompanying drawings. A first embodiment of the present invention will be described with reference to FIG. 1. FIG. 1 is a diagram of an apparatus configured to fly a light-absorbing material according to the present embodiment.

This apparatus configured to fly a light-absorbing material (referred to as flying apparatus) 1 includes a unit (hereinafter referred to as "beam emitter") 2 configured to irradiate a light-absorbing material 11 with a pulsed laser beam 20 corresponding to the light absorption wavelength of the light-absorbing material 11 to fly the light-absorbing material 11.

The light-absorbing material 11 is carried on a transparent sheet 12 that is a carrier that forms a light-absorbing material supply unit 10 and is supplied so as to face a target 3 that is an attachment target placed on a stage 4.

The beam emitter 2 includes a laser oscillator 21 emitting the laser beam 20, a collimator lens 22, an aperture 23, and a scanning optical system 24.

The laser oscillator 21 is a short-pulse laser and outputs the laser beam 20, for example, by a solid laser system, a fiber laser system, or a semiconductor laser system. In this case, fiber laser systems are suitable when high-speed frequency control and power modulation control are performed.

The laser beam 20 output from the laser oscillator 21 is transmitted through the collimator lens 22 and converted into a parallel light flux. The laser beam 20 thus can efficiently propagate to the optical system on the subsequent stage. In view of the optical system in the apparatus as a whole, a collimator lens 22 that provides diverging light or convergent light rather than parallel light may be used.

The scanning optical system 24 includes a cylindrical lens 241, a polygon mirror 242, and a scanning lens 243. A long lens may be disposed on the stage subsequent to the polygon mirror 242.

The laser beam 20 entering the scanning optical system 24 is transmitted through the cylindrical lens 241 and then reaches a light reflection surface of the polygon mirror 242 serving as a rotatable scanning mirror.

The polygon mirror 242 has a regular hexagonal shape in cross section and has light reflection surfaces at individual sides (six sides in the present embodiment) of the regular hexagon. The laser beam 20 reaching the position of the rotating polygon mirror 242 is reflected by any one of the six light reflection surfaces. This reflection angle depends on the angle of the light reflection surface at a moment of reflection, and the angle changes from moment to moment with the rotation of the polygon mirror 242 (hereinafter this change is referred to as "reflection angle change").

The laser beam 20 reflected by any one of the six light reflection surfaces of the polygon mirror 242 is transmitted through the scanning lens 243 and a dustproof glass 244 in order and then passes through the transparent sheet 12 to reach the light-absorbing material 11 (donor surface) carried on the transparent sheet 12.

The laser beam 20 irradiates the light-absorbing material 11, and the light-absorbing material 11 absorbing energy of the laser beam 20 flies from the transparent sheet 12 to adhere to the target 3.

The beam emitter 2 may include a folding mirror and a beam shaping optical system, and the scanning optical system 24 may be composed of a galvano scanner.

The flying apparatus 1 also includes a host computer 31 and an exposure condition setting unit 32.

The host computer 31 acquires image data (drawing data) created by, for example, CAD and performs predetermined processing on the acquired drawing data to output the processed data to the exposure condition setting unit 32. The host computer 31 outputs a coordinate control signal to the stage 4 to control the movement of the stage 4.

The exposure condition setting unit 32 outputs exposure parameters, such as an exposure region, scan speed, a frequency, a beam diameter, and an optical power intensity, input by the user in advance and the drawing data sent from the host computer 31 to the laser oscillator 21.

The light-absorbing material supply unit 10 may be anything that supplies the light-absorbing material 11 onto an optical path of the laser beam 20 between the beam emitter 2 and the target 3 that is an attachment target. For example, the light-absorbing material 11 may be supplied through a cylindrical carrier disposed on the optical path of the laser beam 20.

Figure 2:
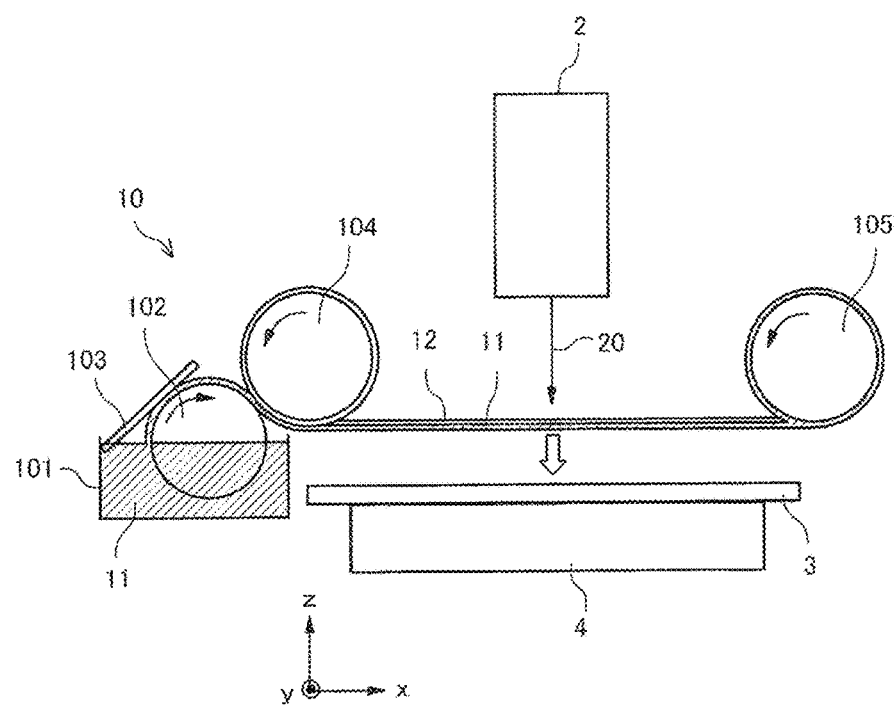
FIG. 2 is a diagram of an example of a light-absorbing material supply unit in the apparatus.

Referring now to FIG. 2, an example of the light-absorbing material supply unit 10 is described. FIG. 2 is a diagram of the light-absorbing material supply unit.

The light-absorbing material supply unit 10 includes a storage tank 101 for storing the light-absorbing material 11, a supply roller 102, a metering blade 103, a light-absorbing material carrying roller 104, and a recovery roller 105.

The supply roller 102 is disposed in abutment with the light-absorbing material carrying roller 104 and partially soaked in the light-absorbing material 11 in the storage tank 101. The supply roller 102 attaches the light-absorbing material 11 to the peripheral surface while being rotated in the arrow direction by a rotation driver or by following the rotation of the light-absorbing material carrying roller 104.

The light-absorbing material 11 attached to the peripheral surface of the supply roller 102 has the average thickness evened out by the metering blade 103 and transfers to the transparent sheet 12 on the light-absorbing material carrying roller 104 side to be supplied as a layer.

The light-absorbing material carrying roller 104 rotates to successively supply the light-absorbing material 11 supplied to the transparent sheet 12 to the position irradiated with the laser beam 20. After laser beam radiation, the light-absorbing material 11 is recovered together with the transparent sheet 12 by the recovery roller 105.

Figures 3A, 3B:
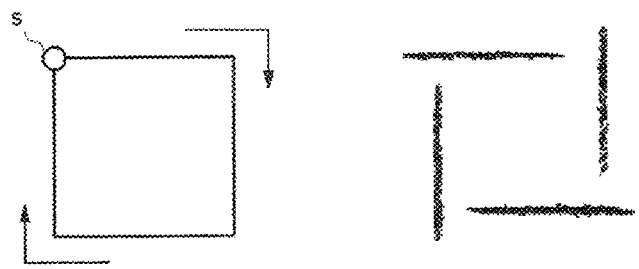
FIGS. 3A and 3B are diagrams illustrating an input image and a trajectory of a laser beam on a carrier, and a drawing result.
Figure 4:
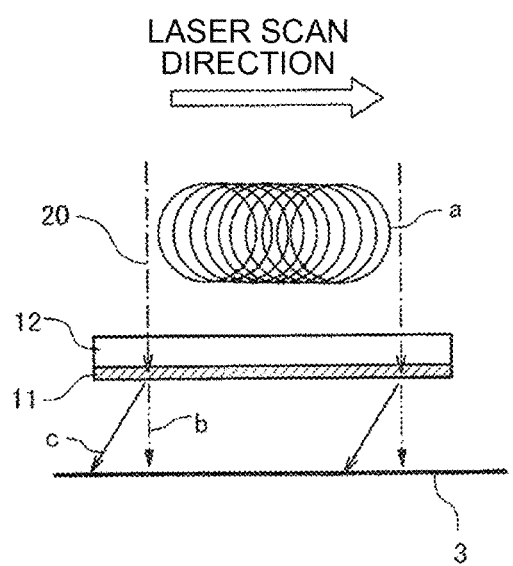
FIG. 4 is a diagram serving to illustrate backward flight likewise.

Referring now to FIGS. 3A and 3B and FIG. 4, a deviation in the drawing result due to backward flight of the light-absorbing material will be described. FIGS. 3A and 3B are diagrams illustrating an input image and a trajectory of a laser beam on the carrier, and a drawing result, and FIG. 4 is a diagram serving to illustrate backward flight likewise.

Here, the light-absorbing material 11 disposed at a distance of 0.5 mm from the target 3 was irradiated with a short-pulse laser beam 20 with a wavelength of 532 nm and a pulse width of 8 ns, whereby the light-absorbing material 11 was flown to the target 3.

In this case, the light-absorbing material 11 was ink having a viscosity of 4 Pa·s and a film thickness of 20 μm.

The light-absorbing material 11 was irradiated with the laser beam 20 with scan speed v of the laser beam 20=30 mm/s, the frequency f=50 kHz, and a beam outer diameter d=0.04 mm.

As illustrated in FIG. 3A, the light-absorbing material 11 was flown by emitting the laser beam 20 clockwise as indicated by the arrow, starting from a position s of an input image of a square 3 mm per side. In doing so, as illustrated in FIG. 3B, it was found that there was a deviation in the drawing result on the target 3.

More specifically, as illustrated in FIG. 3A, the square 3 mm per side is drawn correctly on the transparent sheet 12 as a carrier, whereas a significant deviation between the sides occurs in the image drawn on the target 3.

We have studied this deviation in the image and found that, as illustrated in FIG. 4, the deviation is caused by the light-absorbing material 11 flying not vertically (a direction b along the radiation direction of the laser beam 20) but in a direction c toward the back side (backward with respect to the scanning direction of the laser beam 20).

Figure 5A:
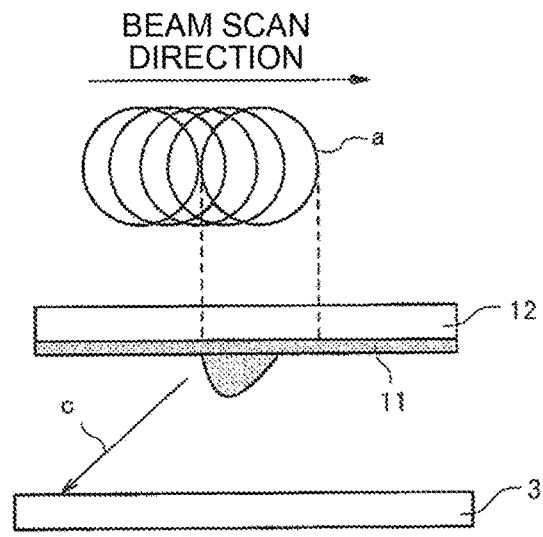
FIGS. 5A and 5B are diagrams serving to illustrate a mechanism by which backward flight of the light-absorbing material occurs.
Figure 5B:
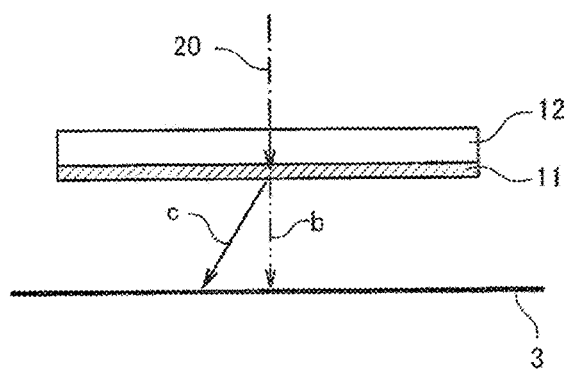
Figure 6:
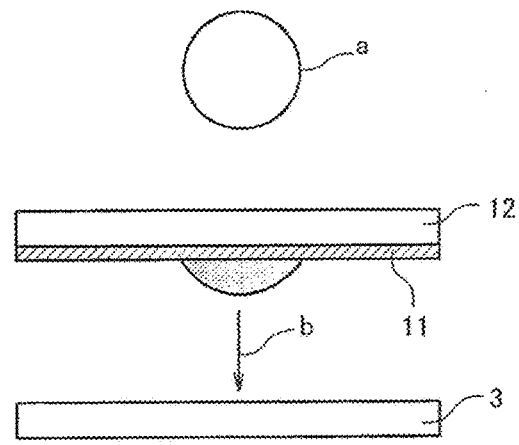
FIG. 6 is a diagram serving to illustrate a case where backward flight does not occur.

Referring now to FIGS. 5A and 5B and FIG. 6, the mechanism by which the backward flight of the light-absorbing material occurs will be described. FIGS. 5A and 5B are diagrams serving to illustrate a case where backward flight occurs, and FIG. 6 is a diagram serving to illustrate a case where backward flight does not occur.

As illustrated in FIG. 5A, beam radiation regions a by the laser beam 20 were irradiated at an overlap ratio of 75%, with an advance of ¼ dot per scan, that is, an advance of one beam diameter by four radiations, as a model.

The light-absorbing material 11 flies after thermally expanding. When the overlap ratio of the laser beam 20 is high, as illustrated in FIG. 5A, the thermal expansion is deviated to the back side with respect to the beam radiation region a into an asymmetric shape.

Then, the front side to the laser beam 20 is short of exposure at the initial state when irradiated with the laser beam 20, whereas a sufficient energy is reached on the back side, and therefore radiation of the laser beam 20 is asymmetric relative to the thermal expansion degree of the light-absorbing material 11. As a result, as illustrated in FIG. 5, the light-absorbing material 11 flies not in the direction b along the radiation direction of the laser beam 20 but in the backward direction c with respect to the scan direction.

In comparison, as illustrated in FIG. 6, in the case of an isolated dot, there is no deviation in thermal expansion of the light-absorbing material 11 due to overlapping of the beam radiation regions a, and the light-absorbing material 11 therefore flies in the direction b along the radiation direction of the laser beam 20, causing no backward flight.

Then, in the present embodiment, when the light-absorbing material is irradiated with a pulsed laser beam to fly, the centroid position of the laser beam is set so as not to overlap the last beam radiation region. More specifically, in the present embodiment, when the preceding beam radiation region and the following beam radiation region overlap, the following beam radiation region is irradiated with the laser beam such that the beam centroid position is outside the preceding beam radiation region.

Figure 7A:
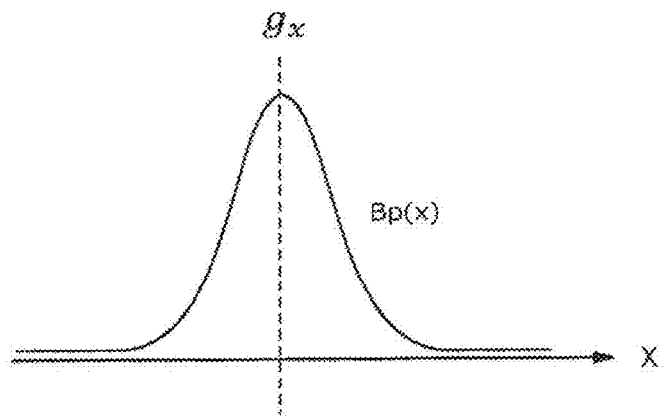
FIGS. 7A to 7C are diagrams illustrating the relation between a laser beam exposure intensity distribution and a beam centroid position.
Figure 7B:
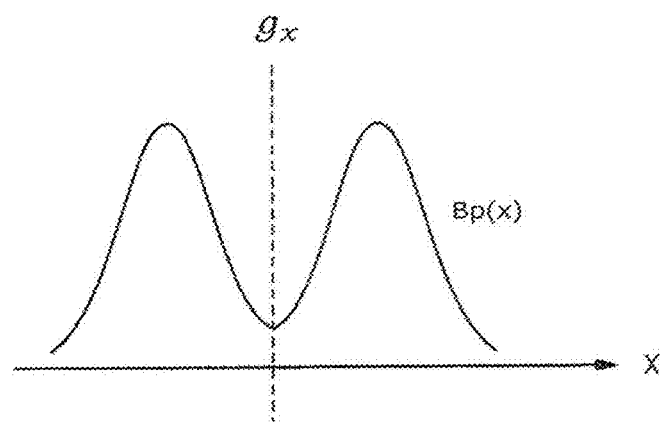
Figure 7C:
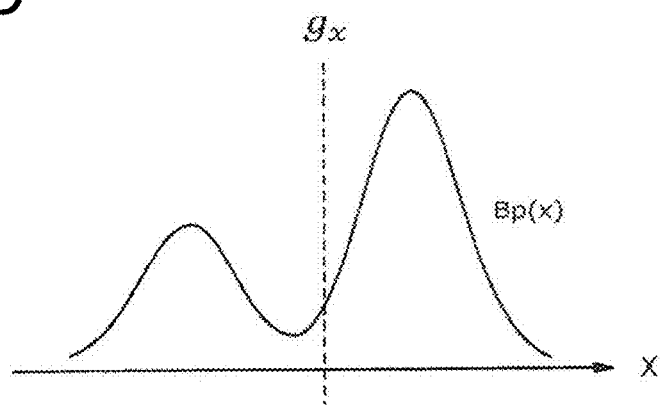

The beam centroid position will now be described with reference to FIGS. 7A to 7C. FIGS. 7A to 7C are diagrams illustrating the relation between a laser beam exposure intensity distribution and a centroid position.

The centroid in the beam centroid position is the center position that reflects the exposure intensity distribution of the radiation region (beam radiation region a) of the laser beam 20 formed on the surface of the light-absorbing material 11.

With an ideal Gaussian beam, as illustrated in FIG. 7A, a beam centroid position gx agrees with the position of the maximum intensity at the center. On the other hand, with a ring-shaped beam, as illustrated in FIG. 7B, the beam centroid position gx differs from the position of the maximum intensity. With an asymmetric shape in the actual beam profile or design, as illustrated in FIG. 7C, the beam centroid position gx differs from the position of the maximum intensity.

The centroid position in an intensity distribution will now be described.

In general, when a physical distribution quantity is Bp(x), the centroid position gx is the total sum of physical quantities represented by the following equation.

$$g_x = \frac{\int xBp(x)dx}{\int Bp(x)dx}$$

Similarly, when the centroid position in the y coordinate is gy, the centroid position gy is represented by the following equation.

$$g_y = \frac{\int yBp(y)dy}{\int Bp(y)dy}$$

When Bp(x) and Bp(y) are exposure intensity distributions, (gx,gy) can be defined as the centroid position in the laser beam 20.

More specifically, when the polygon mirror 242 (or a galvano scanner) is used for scanning, the laser beam is to be scanned at a scan speed greater than ½ of the product of the beam outer diameter and the scan frequency.

That is, when the scan speed of the laser beam 20 is v (mm/s), the scan frequency is f (Hz) (period 1/f), and the outer size (beam outer diameter) of the laser beam 20 is d (mm), scanning is performed such that the following relation is satisfied:

$v > f \times d/2$.

Here, the beam outer diameter is $1/e^2$ of the exposure intensity distribution maximum value.

Applying this to the drawing example in FIGS. 3A and 3B, obtained is f×d/2=1000 as v=30 mm/s, f=50 kHz, and d=0.04 mm.

It follows that v=30<f×d/2=1000, and the right side is about 30 times greater.

That is, in the drawing example in FIGS. 3A and 3B, when the light-absorbing material 11 is irradiated with the pulsed laser beam 20 to fly, the radiation is performed such that the centroid position of the laser beam 20 overlaps the last beam radiation region a, causing a deviation in the image.

Figure 8A:
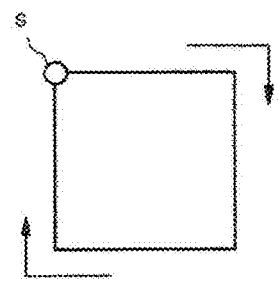
FIGS. 8A and 8B are diagrams illustrating an input image and a trajectory of a laser beam on the carrier, and a drawing result to illustrate an example of the drawing result in the first embodiment.
Figure 8B:
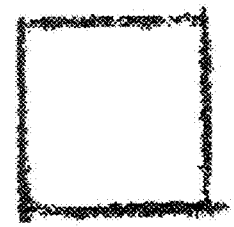

An example of the drawing result in the present embodiment will now be described with reference to FIGS. 8A and 8B. FIGS. 8A and 8B are diagrams illustrating an input image and a trajectory of a laser beam on the carrier, and a drawing result to illustrate the example.

In this drawing example in FIGS. 8A and 8B, a light-absorbing material 11 as in the drawing example in FIGS.

3A and 3B is used, and the distance from the target 3 is as in the drawing example in FIGS. 3A and 3B.

Then, with the scan speed v of the laser beam 20=50 mm/s, the frequency f=2 kHz, and the beam outer diameter d=0.045 mm, as illustrated in FIG. 8A, the light-absorbing material 11 was flown by emitting the laser beam 20 clockwise, starting from a position s of a square 3 mm per side.

As illustrated in FIG. 8B, it was found that a drawing result was free from a deviation on each side of the image on the target 3.

In the drawing example in FIGS. 8A and 8B, v=50 mm/s, f=2 kHz, and d=0.045 mm, and then f×d/2=45 and v=50>f× d/2=45. That is, satisfying the condition above (v>f×d/2) results in a satisfactory drawing pattern free from backward flight.

When the scan speed is too large, dotted points are formed instead of a line. Considering the expansion of flight, it is preferable that the upper limit is optimized as appropriate.

Figure 9A:
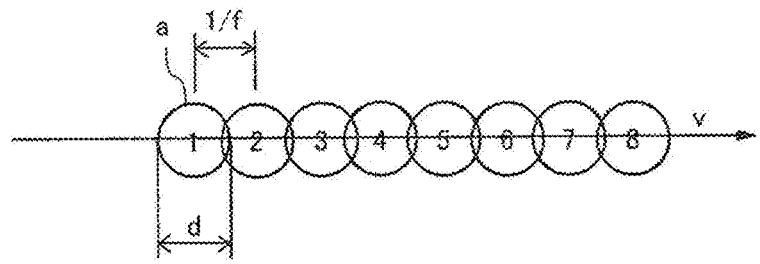
FIGS. 9A and 9B is a diagram illustrating the relation between a drawing pattern, a dot outer diameter, and a dot position.
Figure 9B:
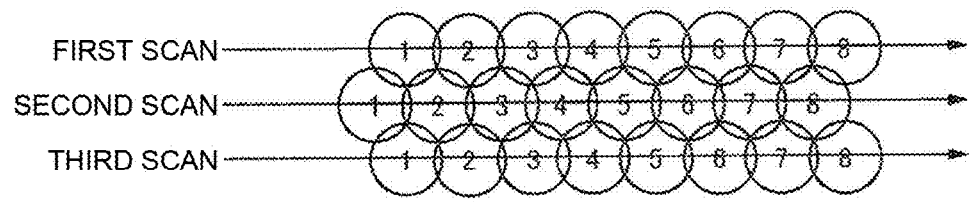

An example of the relation between a drawing pattern, a beam outer diameter, and a dot position will now be described with reference to FIGS. 9A and 9B. FIGS. 9A and 9B are diagrams illustrating the relation.

FIG. 9A illustrates the relation between a dot outer diameter and a dot position when one dot line is drawn. The circles in FIGS. 9A and 9B indicate the beam radiation regions a, and the numbers in the beam radiation regions a indicate the order of radiation. The position of the number in each beam radiation region a is the beam centroid position.

Here, the laser beam 20 is emitted such that the beam radiation regions a are partially overlapped. However, the beam centroid position of the following beam radiation region a is outside the preceding beam radiation region a. Here, the overlapped region takes up only a small proportion of the entire region in terms of the integral light quantity and, therefore, no backward flight occurs.

FIG. 9B illustrates the relation between a dot outer diameter and a dot position when an area is drawn. It is more preferable that the dot positions (phases) are shifted minutely between odd-numbered lines (first scan, third scan, . . . ) and even-numbered lines (second scan, . . . ).

In this way, radiation is performed such that the centroid position of a pulsed laser beam does not overlap the last beam radiation region, whereby the droplet landing position accuracy is improved, and the image quality and the modeling quality are improved.

Figure 10:
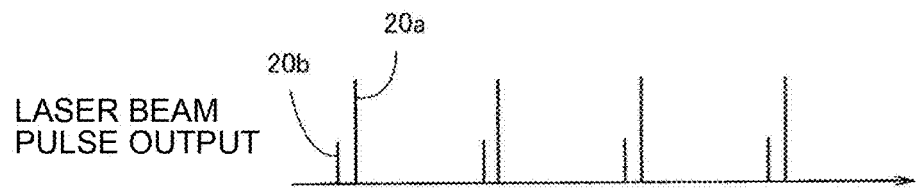
FIG. 10 is a diagram serving to illustrate an example of the laser beam radiation method in a second embodiment of the present invention.

A second embodiment of the present invention will now be described with reference to FIG. 10 and FIGS. 11A to 11C. FIG. 10 is a diagram serving to illustrate a laser radiation method in the present embodiment, and FIGS. 11A to 11C are diagrams serving to illustrate laser beam radiation and flight of a light-absorbing material, in the present embodiment.

In the present embodiment, as illustrated in FIG. 10, before main radiation of emitting a main laser beam 20a to fly the light-absorbing material 11 is performed, pre-radiation of emitting a laser beam 20b that does not fly but thermally expands the light-absorbing material 11 is performed.

In the present embodiment, the quantity of light of the laser beam 20b in pre-radiation is smaller than that of the laser beam 20a in main radiation.

Figure 11A:
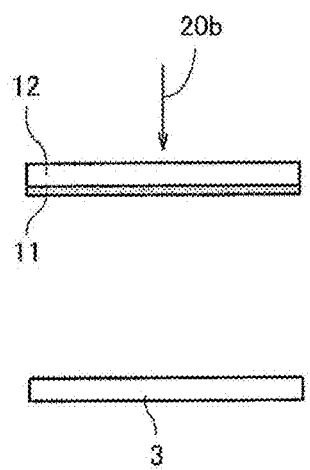
FIGS. 11A to 11C are diagrams serving to illustrate laser beam radiation and flight of a light-absorbing material likewise.
Figure 11B:
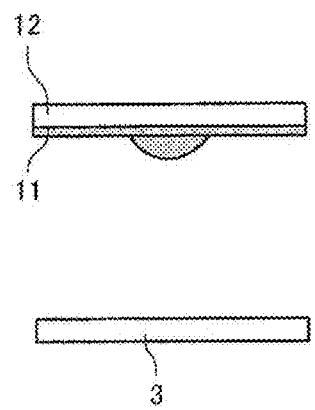
Figure 11C:
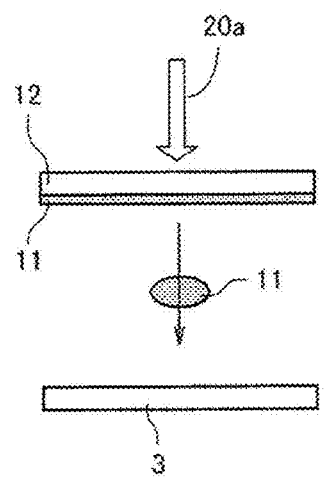

More specifically, as illustrated in FIG. 11A, first radiation (pre-radiation) of the laser beam 20b is performed at time T0. The light-absorbing material 11 then absorbs the laser beam 20b, and the temperature of the light-absorbing material 11 rises. As a result, as illustrated in FIG. 11B, the light-absorbing material 11 starts thermal expansion at time T1.

After the thermal expansion of the light-absorbing material 11 reaches an appropriate state, as illustrated in FIG. 11C, the second radiation (main radiation) of the laser beam 20a is performed at time T2. The thermally expanded light-absorbing material 11 then flies toward the target 3.

In doing so, the condition is that the time from the pre-radiation to the main radiation is short and substantially the same position can be radiated.

For example, when the scan speed v=50 mm/s and the beam diameter d=0.05 mm, the time taken for the laser beam 20 to pass through a distance of 0.05 mm is d/v=1 ms.

The time that ignores this is preferably 1/10 of 1 ms, that is, 100 μs, at longest, and practically 1/50, that is, 20 μs or shorter. This time is converted into a frequency of 50 kHz or higher.

In this way, pre-radiation of emitting the laser beam 20b that does not fly but thermally expands the light-absorbing material 11 is performed before main radiation, thereby suppressing dust particles scattering.

Figure 12A:
FIGS. 12A and 12B are diagrams serving to illustrate an example in which the light-absorbing material is flown by one radiation of a laser beam.
Figure 12B:
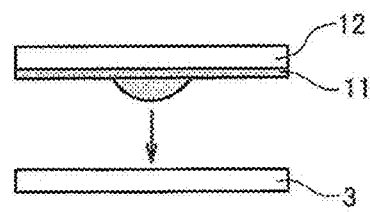

Thermal expansion and flight of the light-absorbing material 11 may be performed simultaneously as illustrated in FIG. 12B by energy by one radiation of the laser beam 20 as illustrated in FIG. 12A. In this method, since energy is applied at a time, expansion is immediately followed by flight of the light-absorbing material 11, and dust particles scattering is likely to occur frequently even though the landing position is normal. In addition, this method is susceptible to the material characteristics and the film thickness.

By contrast, radiation of a laser beam multiple times suppresses dust particles scattering and is less susceptible to the material characteristics and the film thickness.

In the present embodiment, two radiations, in total, including one pre-radiation and one main radiation are performed. However, two pre-radiations and one main radiation may be performed, and the number of times of radiations is not limited.

Figure 13:
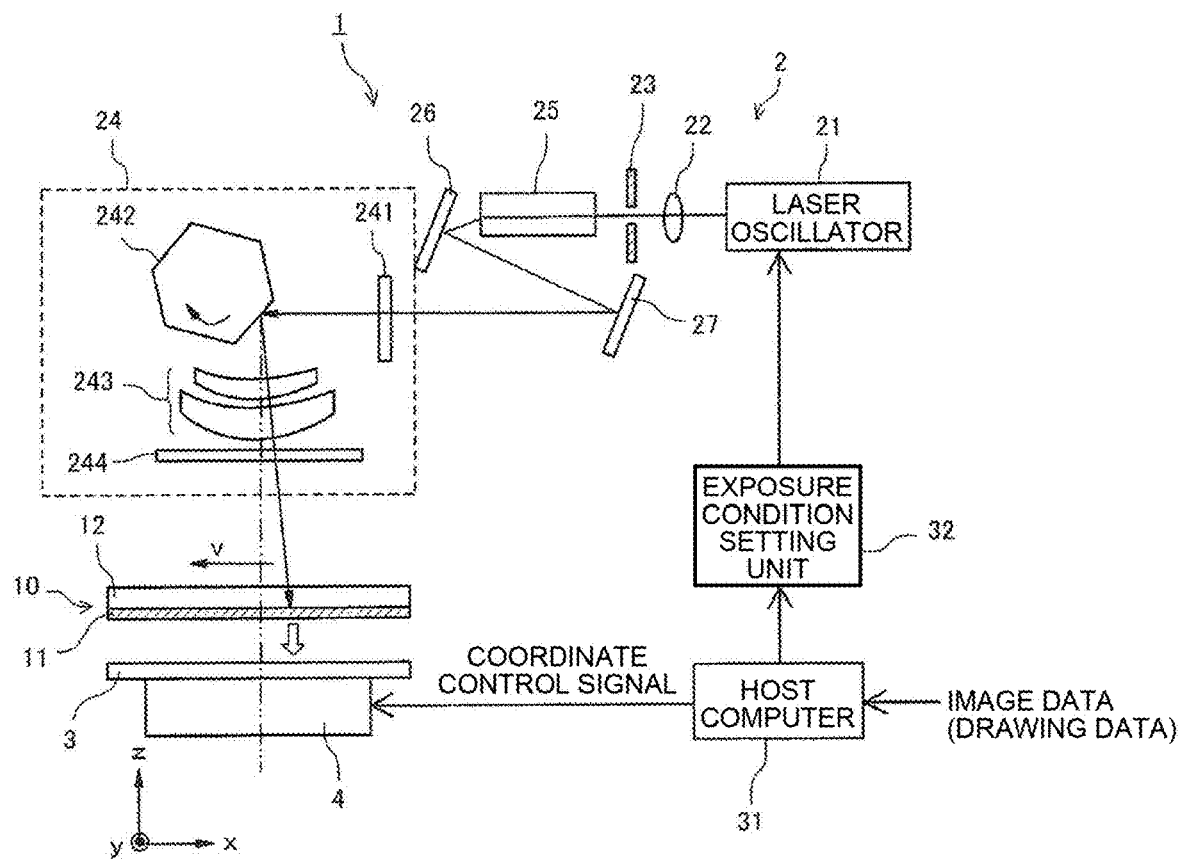
FIG. 13 is a diagram of an apparatus configured to fly a light-absorbing material according to a third embodiment of the present invention.
Figure 14:
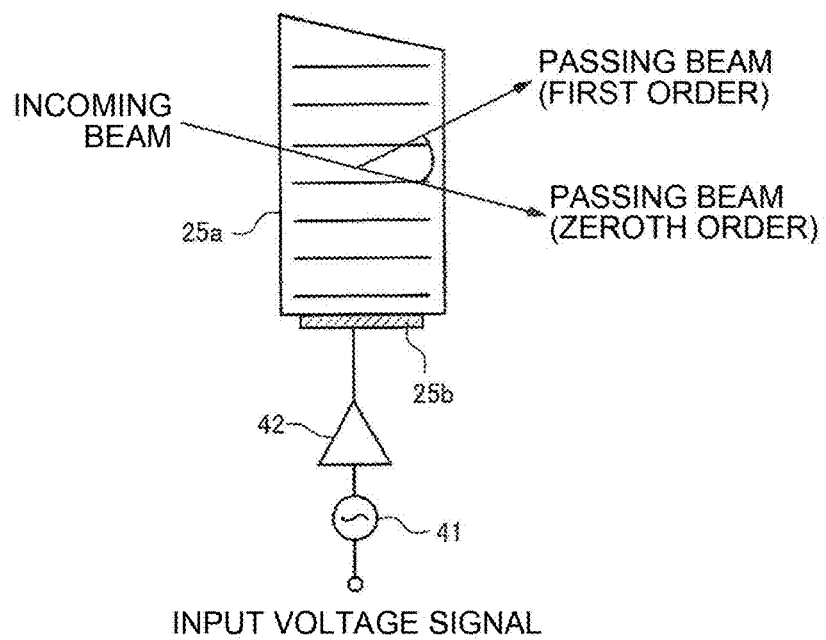
FIG. 14 is a diagram of an acousto-optic modulator and a drive system therefor likewise.

A third embodiment of the present invention will now be described with reference to FIG. 13 and FIG. 14. FIG. 13 is a diagram of an apparatus configured to fly a light-absorbing material according to the present embodiment, and FIG. 14 is a diagram of an acousto-optic modulator and a drive system therefor in the present embodiment.

In this apparatus configured to fly a light-absorbing material (referred to as flying apparatus) 1, an acousto-optic modulator (ACM) 41 is disposed immediately after the collimator lens 22 in the configuration in the first embodiment. Since the ejection direction of an acousto-optic modulator 25 is different, the laser beam 20 is bent by two mirrors 26 and 27 disposed between the acousto-optic modulator 25 and the scanning optical system 24.

Here, the acousto-optic modulator 25 is used for frequency modulation to perform pre-radiation and main radiation.

The acousto-optic modulator is an element that generates ultrasound in an optical medium and diffracts laser light by the wave front of propagating ultrasound, and this diffraction optical modulation element does not include a mechanical movement part and therefore provides high-speed scanning.

For example, as illustrated in FIGS. 12A and 12B, an ultrasonic transducer 25b such as a piezoelectric element is affixed to an acoustic optical medium 25a composed of a single crystal or glass such as tellurium dioxide ($TeO_2$) and lead molybdate ($PbMoO_4$).

An electric signal is externally applied to the ultrasonic transducer 25b to generate ultrasound, and the ultrasound is allowed to propagate through the acoustic optical medium 25a to form a periodic refraction index variation in the acoustic optical medium 25a. The laser light (laser beam) traveling in the acoustic optical medium 25a is then diffracted by Bragg diffraction, and incident light produces ±1, 2, . . . diffracted light in addition to zeroth-order diffracted light.

Here, an angle θ between the zeroth order diffracted light and the first-order diffracted light is represented by the following equation: where λ is the light wavelength in the air, fa is the acoustic wave fundamental frequency, and Va is the acoustic wave speed.

$$\theta = \lambda \cdot f a / V a$$

To change the modulation angle by Δθ, the fundamental frequency fa is shifted by the acoustic wave frequency modulation Δfa.

$$\Delta\theta = \lambda \cdot \Delta f a / V a$$

In the present embodiment, the output of a voltage-controlled oscillator (VCO) 41 capable of controlling the oscillation frequency by voltage is amplified by an RF amplifier 42 and applied to the ultrasonic transducer 25b of the acousto-optic modulator 25 to generate first-order diffracted light.

A required input voltage signal (AOM signal) is therefore applied to the voltage-controlled oscillator 41, so that the required pulse light alone can be extracted from seed light and the remaining can be eliminated.

The acousto-optic modulator is commonly used for frequency modulation to the low frequency side.

Figure 15:
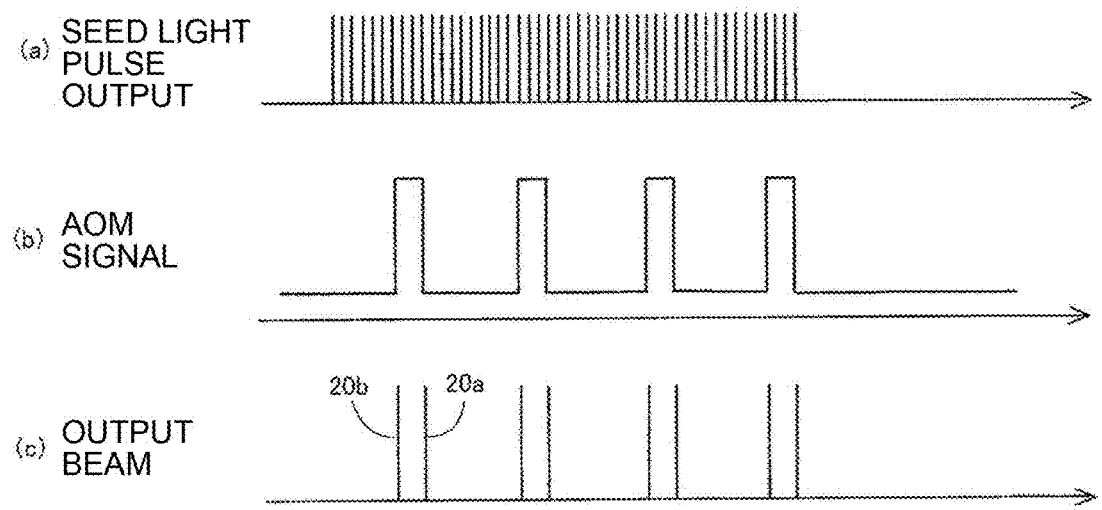
FIG. 15 is a diagram serving to illustrate the effect of the third embodiment.

The effect of the present embodiment will now be described with reference to FIG. 15. FIG. 15 is a diagram serving to illustrate the effect.

For example, a seed light pulse output illustrated at (a) in FIG. 15 is input to the acousto-optic modulator 25, and an AOM signal illustrated at (b) in FIG. 15 is applied to the ultrasonic transducer 25b of the acousto-optic modulator 25.

Then, as illustrated at (c) in FIG. 15, pulse light (laser beams 20b and 20a) can be periodically extracted as two output beams at one time.

Of two laser beams 20a and 20b having the same intensity, the first one can be used for pre-radiation, and the second one can be used for main radiation for flight.

Figure 16:
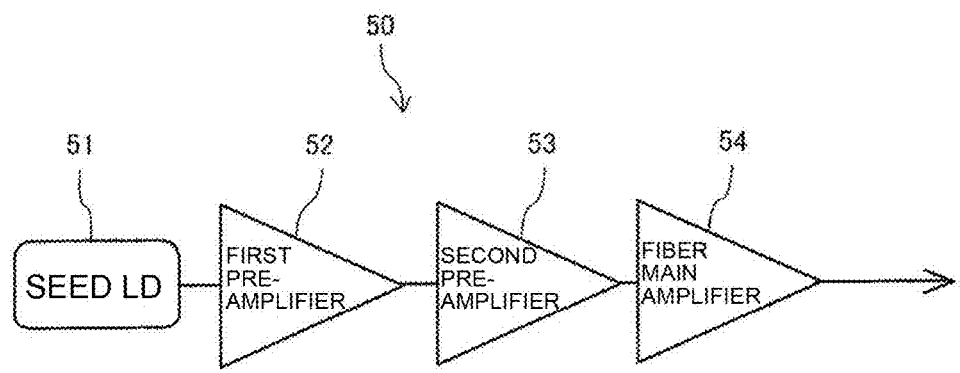
FIG. 16 is a diagram serving to illustrate a laser generator in the apparatus configured to fly a light-absorbing material according to a fourth embodiment of the present invention.

A fourth embodiment of the present invention will now be described with reference to FIG. 16. FIG. 16 is a diagram serving to illustrate a laser generator in the apparatus configured to fly a light-absorbing material according to the present embodiment.

In the present embodiment, a master oscillator power amplifier (MOPA)-type fiber laser is used as a laser generator 50. The fiber laser allows seed light having the pulse width and frequency set, output from a seed LD 51, to pass through a first preamplifier 52, a second amplifier 53, and a fiber main amplifier 54 to output a laser beam 20.

The basic configuration for light amplification (amp) in the MOPA-type fiber laser includes a pump LD, a combiner, and a rare-earth dope fiber and additionally includes an isolator (ISL) for preventing optical feedback and a band-pass filter (BPF) for wavelength selection.

Figure 17:
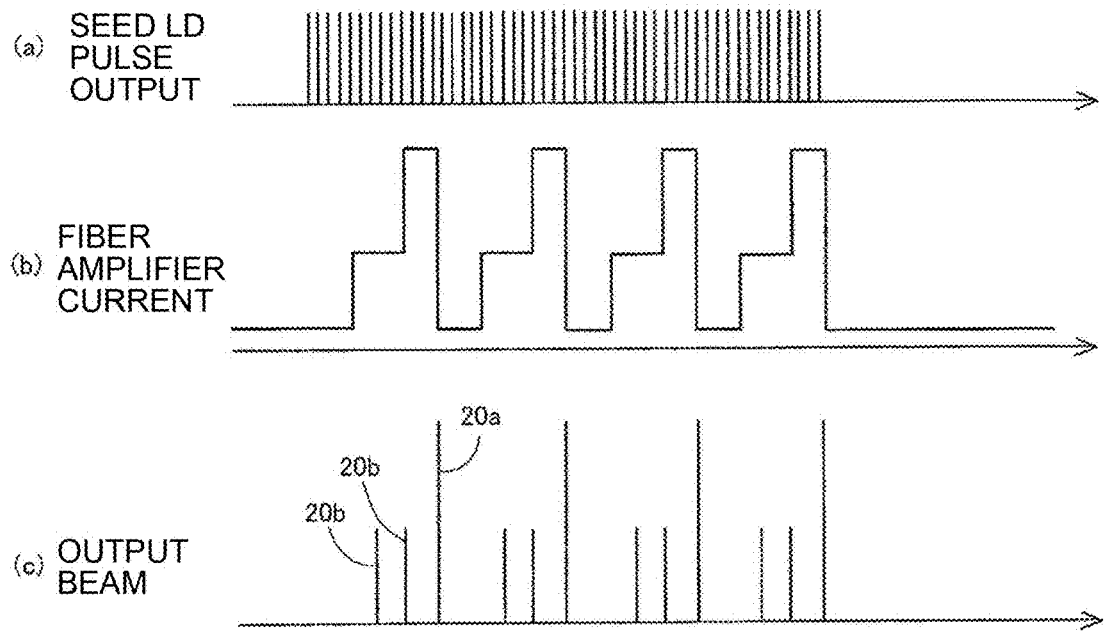
FIG. 17 is a diagram serving to illustrate the effect of the fourth embodiment.

The effect of the present embodiment will now be described with reference to FIG. 17. FIG. 17 is a diagram serving to illustrate the effect.

In the fiber laser, the injection current to the preamplifier 52, 53, or the main amplifier 54 is normally constant, but current modulation is applied in the present embodiment.

More specifically, as illustrated at (a) in FIG. 17, when pulsed seed light (pulse output) is output from the seed LD, fiber amplifier current as illustrated at (b) in FIG. 17 is applied to the preamplifier 52, 53, or the main amplifier 54.

Then, as illustrated at (c) in FIG. 17, two laser beams 20b having the quantity of light smaller than the laser beam 20a are output before the laser beam 20a used for main radiation.

In this way, PM+PWM modulation (phase modulation+ pulse width modulation) is applied by the fiber amplifier to output one or more (here, two) laser beams for pre-radiation.

Figure 18:
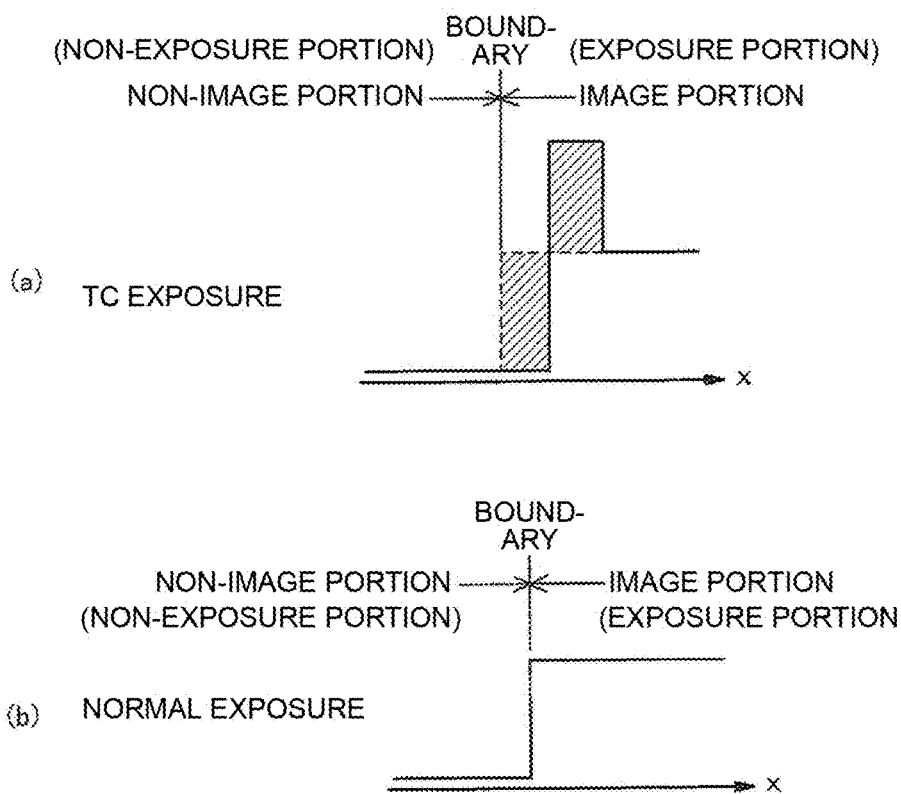
FIG. 18 is a diagram serving to illustrate a fifth embodiment of the present invention.

A fifth embodiment of the present invention will now be described with reference to FIG. 18. FIG. 18 is a diagram serving to illustrate the present embodiment.

In the present embodiment, time concentration exposure (TC exposure) is performed when drawing is performed. TC exposure is a method of performing temporally intensive exposure with a strong optical power for a short turn-on time and capable of achieving improvement in resolution equivalent to that with a small beam size, without changing the beam size.

More specifically, as illustrated at (a) in FIG. 18, an optical power for one or more exposure portion pixels serving as a boundary between an image portion (exposure portion) and a non-image portion (non-exposure portion) in a drawing region is non-exposure and no laser beam is emitted. Instead, exposure is performed (laser beam is emitted) such that the optical power (the quantity of light) for the non-exposure pixels is added to the optical power of the laser beam irradiating the exposure portion pixels in the vicinity of the boundary. This is referred to as "folding process".

With this process, high-quality drawing can be achieved.

In comparison, in the case of normal exposure in which TC exposure is not performed, as illustrated at (b) in FIG. 18, exposure is performed such that a laser beam with the same optical power is emitted to the image portion (exposure portion) from the boundary of the non-image portion (non-exposure portion).

Figure 19:
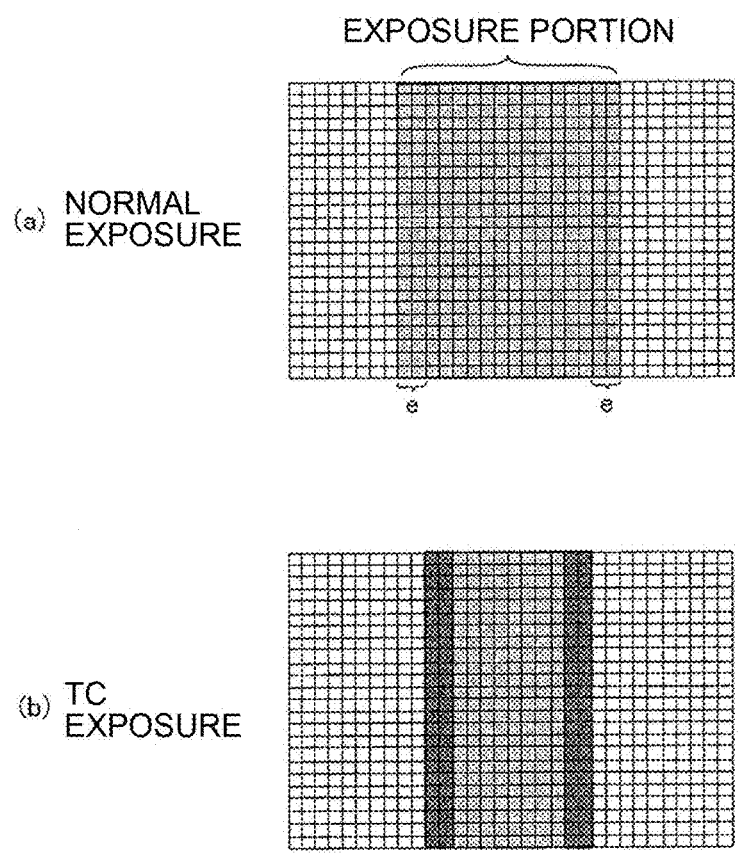
FIG. 19 is a diagram serving to illustrate image portion pixels and non-image portion pixels in normal exposure and TC exposure.

TC exposure and normal exposure will now be described with reference to FIG. 19 and FIG. 20, taking drawing of a vertical line as an example. FIG. 19 is a diagram serving to illustrate image portion pixels and non-image portion pixels, and FIG. 20 is a diagram serving to illustrate an optical power and a flight state of the light-absorbing material.

Figure 20:
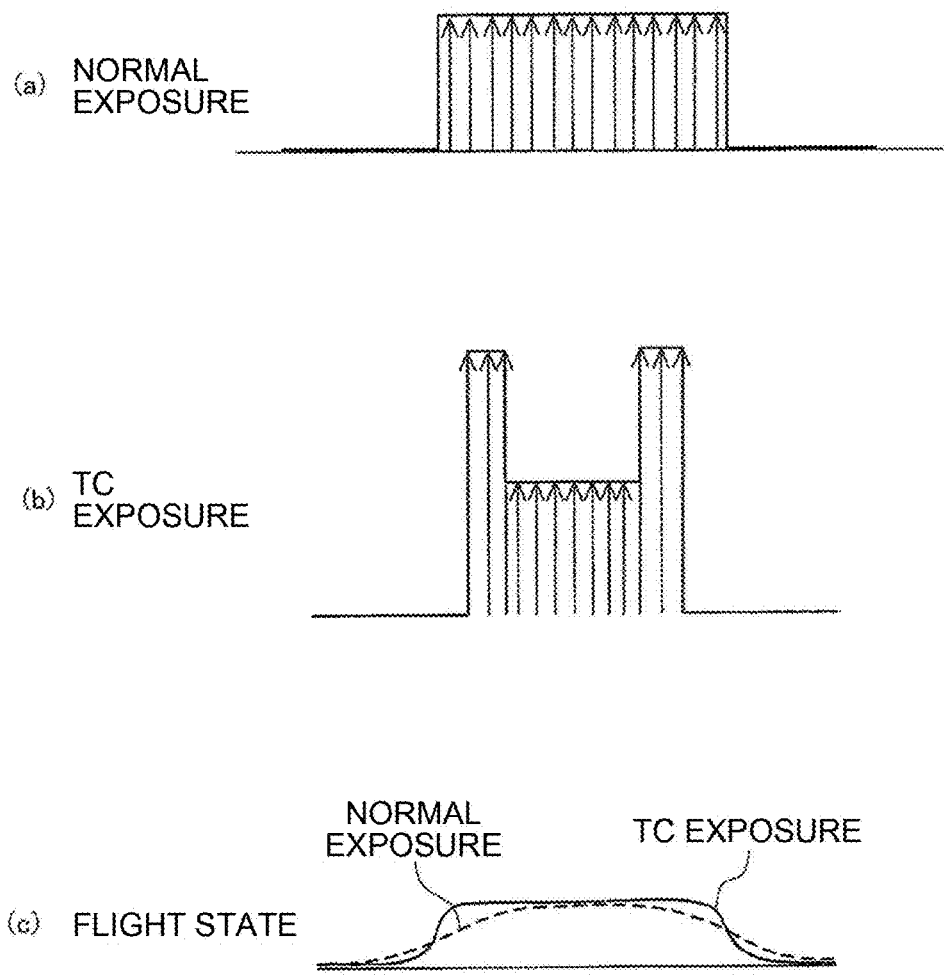
FIG. 20 is a diagram serving to illustrate an optical power and a flight state of the light-absorbing material likewise.

When normal exposure is performed, as illustrated at (a) in FIG. 19 and at (a) in FIG. 20, the optical power for one or more (here, two pixels e) exposure portion pixels at the boundary between the image portion and the non-image portion is non-exposure and no laser beam is applied. Instead, a laser beam with the optical power obtained by adding the optical power (the quantity of light) for the non-exposure pixels to the optical power of a laser beam irradiating the exposure portion pixels in the vicinity of the boundary is emitted.

Thus, the flight state of the light-absorbing material 11 is steep at the boundary between the image portion and the non-image portion as illustrated by a solid line at (c) in FIG. 20, and the image quality is improved.

A sixth embodiment of the present invention will now be described with reference to FIG. 21. FIG. 21 is a flowchart serving to illustrate the present embodiment.

In the present embodiment, the folding process is performed in four directions: right, left, top, and bottom in the image region.

More specifically, referring to FIG. 21, a left folding process is performed for an original image (step S1: hereinafter simply denoted as "S1"), and data storing is performed (data storing I at S2).

Similarly, a right folding process is performed (S3), and data storing is performed (data storing II at S4). A top folding process is performed (S5), and data storing is performed (data storing III at S6). A bottom folding process is performed (S7), and data storing is performed (data storing IV at S8).

Figure 22A:
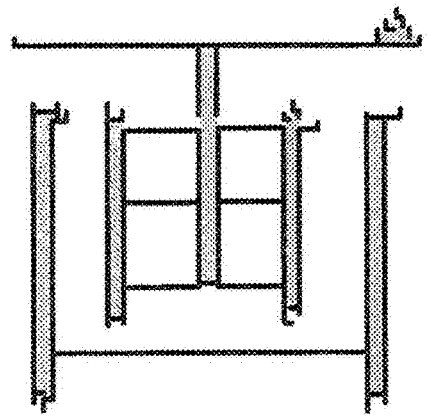
FIGS. 22A and 22B are a diagram serving to illustrate an example in which the process in the sixth embodiment is applied to a character.
Figure 22B:
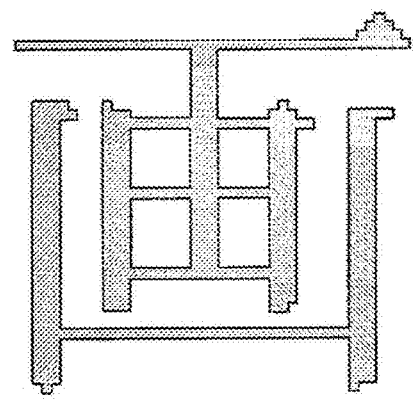

An example in which the process in the present embodiment is applied to a character will now be described with reference to FIGS. 22A and 22B. In FIGS. 22A and 22B, the result of applying the left, right, top, and bottom folding processes to an original image illustrated in FIG. 22B is illustrated in FIG. 22A.

As can be understood from this result, the folding process (TC exposure) can sharpen the edge of the image.

The cut width (the number of pixels) at both ends of the exposure portion can be set as desired and can be changed according to flight distance, material viscosity, and the like.

Figure 23:
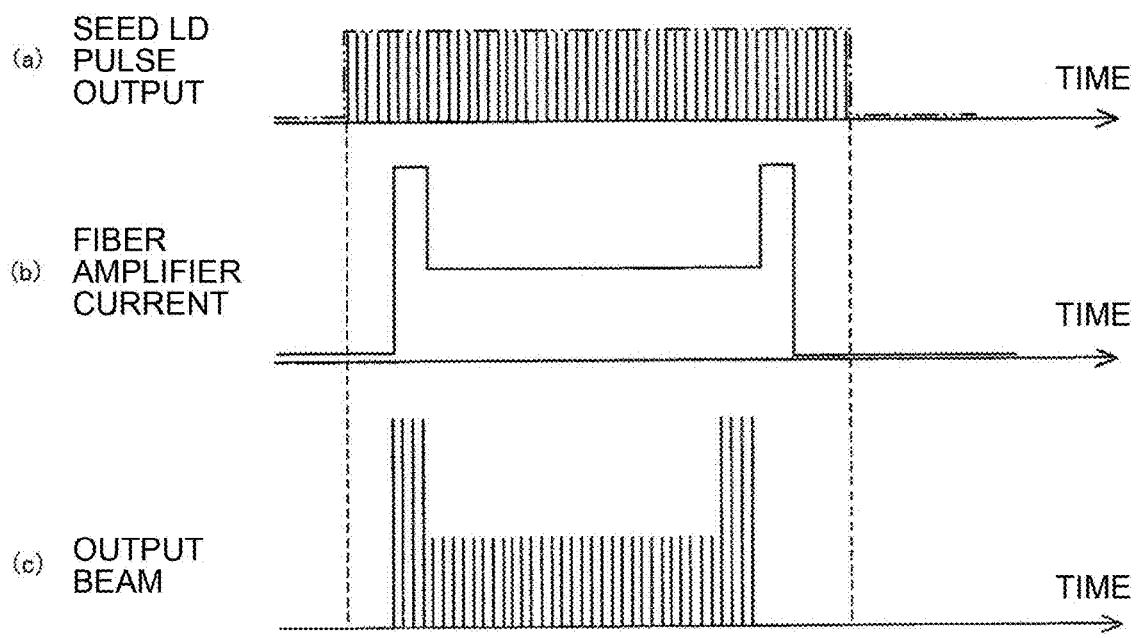
FIG. 23 is a diagram serving to illustrate an example of laser beam generation when a folding process in a seventh embodiment of the present invention is performed.

A seventh embodiment of the present invention will now be described with reference to FIG. 23. FIG. 23 is a diagram serving to illustrate an example of laser beam generation when a folding process in the present embodiment is performed.

In the present embodiment, a fiber laser described in the foregoing fourth embodiment (FIG. 16) is used, and a laser beam for performing TC exposure is generated by the main amplifier of the fiber laser.

More specifically, as illustrated at (a) in FIG. 23, when pulsed seed light (pulse output) is output from the seed LD, fiber amplifier current as illustrated at (b) in FIG. 23 is applied to the preamplifier 52, 53, or the main amplifier 54.

Then, as illustrated at (c) in FIG. 23, a laser beam 20 with the quantity of light increased is output for one or more pixels on the exposure portion side at the boundary between the exposure portion and the non-exposure portion.

TC exposure data is obtained by capturing target image data from CAD, for example, and converting the image data for TC exposure in the host computer 31. The resultant converted data is sent as a drive signal to the main amplifier 54 of the laser generator 50, the scanner, etc., so that the light-absorbing material 11 can be irradiated with the laser beam 20.

Figure 24:
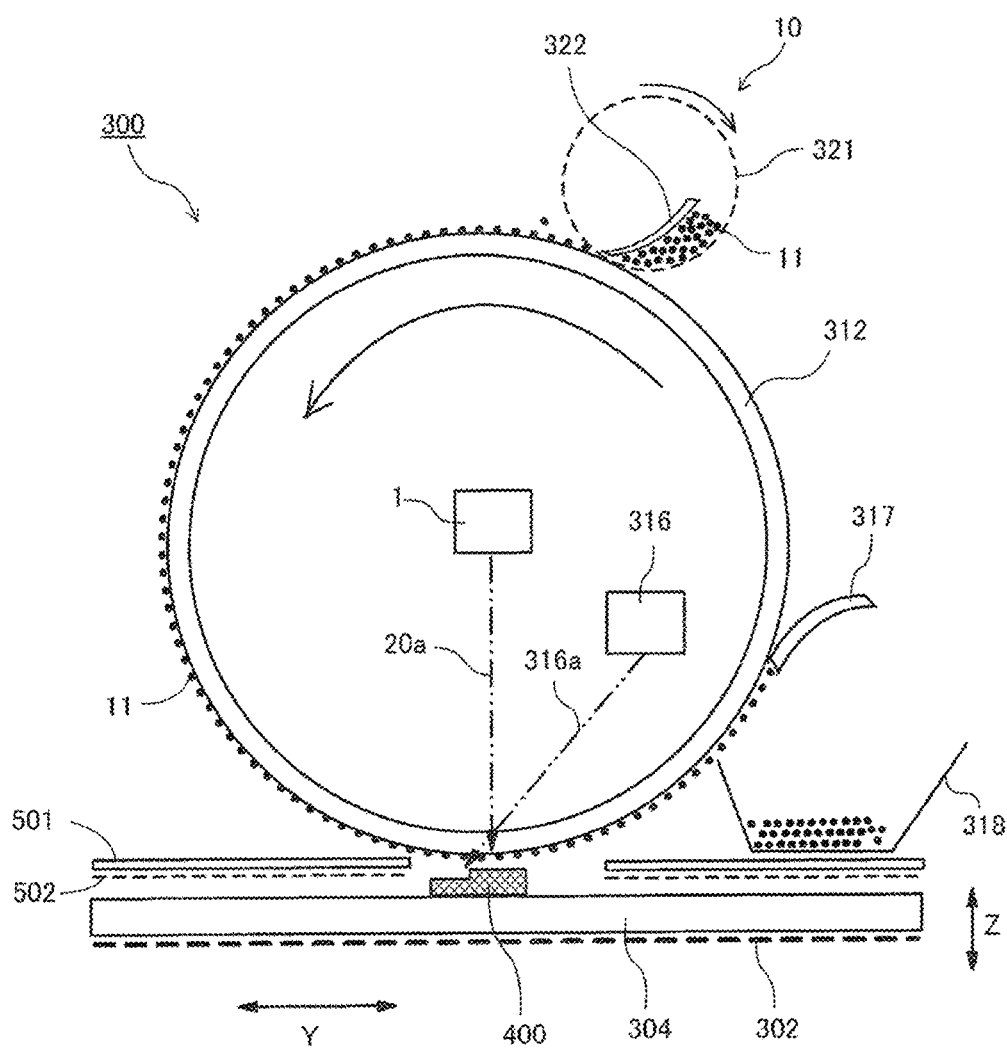
FIG. 24 is a diagram of an example of an apparatus configured to model a three-dimensional modeled object according to an eighth embodiment of the present invention.

An eighth embodiment of the present invention will now be described with reference to FIG. 24. FIG. 24 is a diagram of an example of an apparatus configured to model a three-dimensional modeled object according to the present embodiment.

An apparatus 300 configured to model a three-dimensional modeled object includes a stage 304 that is a support member to support a modeled object to be modeled (modeled object in the modeling process) 400. The stage 304 can reciprocate in an arrow Y direction and can move up and down, for example, at model thickness 0.05-mm pitches in an arrow Z direction.

Under the stage 304, a stage-heating heater 302 is disposed so that the stage 304 is regulated to a temperature suitable for the light-absorbing material 11 as a model material.

Above the stage 304, a carrier 312 formed with a rotating member is disposed to carry the light-absorbing material 11 in the form of particles. The carrier 312 is formed with a rotating drum that carries the light-absorbing material 11 and rotates in the arrow direction (transportation direction) to transport the light-absorbing material 11 to above the modeled object 400 on the stage 304. The carrier 312 is a transparent member and is formed of, but not limited to, a cylindrical glass member.

The light-absorbing material 11 is to be selected as appropriate according to the target modeled object 400. In the case of resins, examples include PA12 (polyamide 12), PBT (polybutylene terephthalate), PSU (polysulfone), PA66 (polyamide 66), PET (polyethylene terephthalate), LCP (liquid crystal polymer), PEEK (polyetheretherketone), POM (polyacetal), PSF (polysulfone), PA6 (polyamide 6), and PPS (polyphenylene sulfide). The light-absorbing material 11 in the present embodiment is not limited to crystalline resins and may be non-crystalline resins such as PC (polycarbonate), ABS (acrylonitrile butadiene styrene), and PEI (polyetherimide), or crystalline and non-crystalline mixed resins.

Besides resins, a variety of materials such as metal, ceramic, and liquid can be used as the light-absorbing material 11. The light-absorbing material 11 may be a material having a viscosity of 1 pa·s or more.

The light-absorbing material 11 is carried on the peripheral surface of the carrier 312 by Van der Waals force in the present embodiment. When the resistance value of the light-absorbing material 11 is high, the light-absorbing material 11 can be carried only by electrostatic adhesion force.

On the periphery of the carrier 312, a light-absorbing material supply unit 310 is disposed to supply the light-absorbing material 11 to the peripheral surface (surface) of the carrier 312.

The light-absorbing material supply unit 310 includes a mesh roller 321 supplied with the light-absorbing material 11 in the inside and rotating in the arrow direction and a blade 322 for rubbing and scrubbing the light-absorbing material 11 inside the mesh roller 321. This light-absorbing material supply unit 312 breaks agglomerates while rubbing and scrubbing the light-absorbing material 11 with the blade 322 to allow the light-absorbing material 11 to pass through the mesh roller 321, thereby forming a thin film of the light-absorbing material 11 on the peripheral surface of the carrier 312.

The opening of mesh of the mesh roller 321 is preferably 20 to 30% larger than the average particle size of the light-absorbing material 11. Although a woven metal wire can be used, a flat mesh fabricated by electroforming is more preferred.

The supply by the light-absorbing material supply unit 312 is not limited to a mesh roller. For example, contact supply by a rotor, non-contact supply, spraying from a mesh not in contact, immersion in fluidized bed by powder aeration may be employed.

In the inside of the carrier 312, the light-absorbing material flying apparatus 1 is disposed as a unit configured to fly the light-absorbing material 11 from the peripheral surface of the carrier 311.

The light-absorbing material flying apparatus 1 has a configuration similar to any one of the foregoing embodiments and irradiates the light-absorbing material 11 with the pulsed laser beam 20a from the inside of the carrier 312 (the radiation position is set as "modeling position").

The light-absorbing material 11 receives the laser beam 20a and thereby flies from the peripheral surface of the carrier 312 in the radiation direction of the laser beam 20a.

A portion of the surface of the modeled object 400 to which the light-absorbing material 11 is to be attached is irradiated with laser light 316a from a laser for melting 316 and is then heated and melted.

As a result, the light-absorbing material 11 flying from the carrier 312 lands on the surface of the modeled object 400 in a melted state to incorporate into the modeled object 400, whereby the modeled object 400 is grown by at least one light-absorbing material.

In this way, while the light-absorbing material 11 is successively transported onto the stage 304 through continuous rotation of the carrier 312, the melting of the surface of the modeled object 400 by the laser for melting 316 and the flying and landing of the light-absorbing material 11 as a model material by the light-absorbing material flying apparatus 1 are repeated until the modeling is completed.

In this way, the modeled object 400 is grown to a predetermined shape whereby a three-dimensional modeled object can be modeled.

An embodiment improves the accuracy of the direction in which the light-absorbing material flies.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An apparatus configured to fly a light-absorbing material, comprising:
a unit configured to irradiate a light-absorbing material with a laser beam, a wavelength of the laser beam corresponding to a light absorption wavelength of the light-absorbing material to fly the light-absorbing material, the laser beam being a ring-shaped beam,
the light-absorbing material being a resin, metal, ceramic or liquid, and having a viscosity of 1 pascal-second or more,
the unit being configured to
irradiate the laser beam in rows along a scanning direction, and
create beam radiation regions including a preceding beam radiation region and a following beam radiation region, based on the preceding beam radiation region and the following beam radiation region overlapping, the unit is configured to irradiate the following beam radiation region with the laser beam such that a beam centroid position is outside the preceding beam radiation region, a beam centroid position of the beam radiation regions in the second row do not overlap in a direction perpendicular to the scanning direction with a beam centroid position of adjacent beam radiation regions in the first row.

2. The apparatus configured to fly a light-absorbing material according to claim 1, wherein a scan speed of the unit in the scanning direction is greater than ½ of a product of a beam outer diameter of the laser beam and a scan frequency, the beam outer diameter being $1/e^2$ of an exposure intensity distribution maximum value.

3. The apparatus configured to fly a light-absorbing material according to claim 1, wherein before the laser beam that is a main laser beam is emitted, pre-radiation of emitting the laser beam that is a sub-powered laser beam is performed.

4. The apparatus configured to fly a light-absorbing material according to claim 3, further comprising an acousto-optic modulator, wherein
the laser beam for the pre-radiation is generated by the acousto-optic modulator.

5. The apparatus configured to fly a light-absorbing material according to claim 3, further comprising a fiber laser configured to output the laser beam, wherein
injection current to a main amplifier of the fiber laser is modulated to generate the laser beam for the pre-radiation.

6. The apparatus configured to fly a light-absorbing material according to claim 3, wherein the main laser beam and sub-powered laser beam are centered at a same point.

7. The apparatus configured to fly a light-absorbing material according to claim 3, wherein the sub-powered laser beam is configured to contact the light-absorbing material before the main laser beam.

8. The apparatus configured to fly a light-absorbing material according to claim 1, wherein the unit is configured to perform a folding process in which a quantity of light of the laser beam irradiating a pixel region of an exposure portion, the pixel region including one or more pixels from a boundary between the exposure portion and a non-exposure portion in a drawing region, is added to a quantity of light of the laser beam irradiating another pixel region of the exposure portion, is performed.

9. The apparatus configured to fly a light-absorbing material according to claim 8, wherein the folding process is performed for a plurality of directions in an image.

10. An apparatus configured to model a three-dimensional modeled object, comprising the apparatus configured to fly a light-absorbing material according to claim 1.

11. The apparatus configured to model a three-dimensional modeled object according to claim 10, further comprising:
- a carrier configured to carry the light-absorbing material; and
- a unit configured to heat a surface of a modeled object, wherein
- the light-absorbing material carried by the carrier is flown to a surface of the modeled object heated and melted, by the apparatus configured to fly a light-absorbing material.

12. The apparatus configured to model a three-dimensional modeled object according to claim 11, wherein
- the unit configured to heat a surface of a modeled object comprises a unit configured to emit a laser beam for heating, and
- a peak power of the laser beam for heating is smaller than a peak power of the laser beam configured to fly the light-absorbing material.

13. The apparatus configured to fly a light-absorbing material according to claim 11, wherein the carrier is a rotatable drum and is configured to carry the light-absorbing material on a peripheral during rotation of the carrier.

14. The apparatus configured to fly a light-absorbing material according to claim 1, wherein a position of maximum intensity of the ring-shape is different from the centroid position.

15. The apparatus configured to fly a light-absorbing material according to claim 14, wherein the position of maximum intensity is two points on opposite sides of the centroid position and equidistant to the centroid position and form the ring-shape.

16. A method of flying a light-absorbing material, comprising irradiating a light-absorbing material with a pulsed laser beam, a wavelength of the laser beam corresponding to a light absorption wavelength of the light-absorbing material to fly the light-absorbing material, the laser beam being a ring-shaped beam, the light-absorbing material being a resin, metal, ceramic or liquid, and having a viscosity of 1 pascal-second or more,
the irradiating the laser beam including
- moving the laser beam in a scanning direction along a first row,
- moving the laser beam in the scanning direction along a second row, and
- creating beam radiation regions including a preceding beam radiation region and a following beam radiation region, based on the preceding beam radiation region and the following beam radiation region overlapping, the laser beam is emitted to the following beam radiation region such that a beam centroid position is outside the preceding beam radiation region, a beam centroid position of the beam radiation regions in the second row do not overlap in a direction perpendicular to the scanning direction with a beam centroid position of adjacent beam radiation regions in the first row.

* * * * *